(12) United States Patent
Lacaze et al.

(10) Patent No.: US 11,364,898 B2
(45) Date of Patent: Jun. 21, 2022

(54) AUTONOMOUS VEHICLE CONTROLLED CRASH

(71) Applicant: Robotic Research OpCo, LLC, Clarksburg, MD (US)

(72) Inventors: Alberto Daniel Lacaze, Potomac, MD (US); Karl Nicholas Murphy, Cocoa Beach, FL (US)

(73) Assignee: Robotic Research OpCo, LLC, Clarksburg, MD (US)

( * ) Notice: Subject to any disclaimer, the term of this patent is extended or adjusted under 35 U.S.C. 154(b) by 112 days.

(21) Appl. No.: 16/390,360

(22) Filed: Apr. 22, 2019

(65) Prior Publication Data
US 2020/0331464 A1    Oct. 22, 2020

(51) Int. Cl.
*G05D 1/02* (2020.01)
*G08G 1/00* (2006.01)
*G05D 1/00* (2006.01)
*B60W 30/085* (2012.01)

(52) U.S. Cl.
CPC ......... *B60W 30/085* (2013.01); *G05D 1/0088* (2013.01); *G05D 1/0217* (2013.01); *G05D 1/0293* (2013.01); *G08G 1/22* (2013.01); *G05D 2201/0213* (2013.01)

(58) Field of Classification Search
CPC . B60W 30/085; G05D 1/0088; G05D 1/0217; G05D 1/0293; G05D 2201/0213; G08G 1/22
See application file for complete search history.

(56) References Cited

U.S. PATENT DOCUMENTS

| | | | |
|---|---|---|---|
| 4,068,877 A | * | 1/1978 | Burleson ................. B60R 19/00 293/72 |
| 4,072,945 A | | 2/1978 | Katsumata et al. |
| 4,403,220 A | | 9/1983 | Donovan |
| 5,272,483 A | | 12/1993 | Kato |
| 5,314,037 A | | 5/1994 | Shaw et al. |
| 5,983,161 A | | 11/1999 | Lemelson et al. |

(Continued)

FOREIGN PATENT DOCUMENTS

| | | | | |
|---|---|---|---|---|
| CN | 205899215 U | * | 1/2017 | ............. G03B 15/05 |
| CN | 205899215 U | * | 1/2017 | ............. F21V 19/00 |

(Continued)

*Primary Examiner* — Jelani A Smith
*Assistant Examiner* — Frank T Glenn, III
(74) *Attorney, Agent, or Firm* — RowanTree Law Group, PLLC; Carson C. K. Fincham

(57) ABSTRACT

Military convoys sometimes need to push vehicles or obstacles out of the way in order to proceed with their mission. Selecting if pushing is necessary, what can be pushed, and what cannot be pushed as well as the specific maneuver necessary for pushing or creating a controlled crash are important to minimize the damage to the autonomous vehicles as well as to create pathways that are traversable by other autonomous vehicles in the convoy. These tasks are accomplished by evaluating the costs involved in each trajectory that can be navigated by the autonomous convoy and deciding if pushing the obstacle is the preferred path or navigating around the obstacle is the preferred path for the autonomous vehicles. Also, in some cases, several autonomous vehicles simultaneously push the obstacle at the same time.

11 Claims, 5 Drawing Sheets

(56) References Cited

U.S. PATENT DOCUMENTS

| | | | |
|---|---|---|---|
| 6,435,803 B1* | 8/2002 | Robinson | B60P 3/06 414/539 |
| 6,678,582 B2 | 1/2004 | Waled | |
| 7,418,346 B2 | 8/2008 | Breed et al. | |
| 9,826,156 B1* | 11/2017 | Liu et al. | H04N 5/222 |
| 9,894,101 B2* | 2/2018 | Hendrick | H04L 63/20 |
| 10,768,001 B2* | 9/2020 | Ghannam et al. | G01C 21/34 |
| 2002/0192063 A1* | 12/2002 | Fluke, Jr. | B60P 3/12 414/563 |
| 2014/0230571 A1* | 8/2014 | Pape | G01M 10/00 73/862.381 |
| 2014/0309835 A1* | 10/2014 | Yamamoto | G06Q 10/047 701/25 |
| 2017/0361461 A1* | 12/2017 | Tan | B25J 19/021 |
| 2018/0143641 A1* | 5/2018 | Rao | B60W 60/0023 |
| 2018/0210445 A1* | 7/2018 | Choi | G05D 1/0044 |
| 2019/0086921 A1* | 3/2019 | Xia | G05D 1/021 |
| 2019/0143964 A1* | 5/2019 | Zuckerman | B60W 60/001 701/23 |
| 2020/0293049 A1* | 9/2020 | De Castro | G05D 1/0088 |

FOREIGN PATENT DOCUMENTS

| | | | | |
|---|---|---|---|---|
| CN | 205899215 U | * | 1/2017 | |
| WO | WO 2017/164792 A1 | * | 9/2017 | G08G 1/16 |

\* cited by examiner

AUTONOMOUS VEHICLE CONTROLLED CRASH

CROSS-REFERENCE TO RELATED APPLICATIONS

Not applicable.

BACKGROUND OF THE INVENTION

1. Field of the Invention

The present invention relates to a system involving a controlled crash or push between an autonomous vehicle and an obstacle or another autonomous vehicle with the intention of removing the obstacle from the roadway or to open up the roadway. It involves evaluating the costs associated with each trajectory path that can be navigated by the autonomous convoy and deciding whether it is preferable to push the obstacle in the path or to go around the obstacle. Also, in some cases, several autonomous vehicles simultaneously push the obstacle at the same time.

2. Description of Related Art

The statements in this section merely provide background information related to the present disclosure and may not constitute prior art.

There are no patents in the literature involving the generation of controlled crashes or push between an autonomous vehicle and an obstacle or another autonomous vehicle for any type of application. On the other hand, there is a lot of literature that involves patents developed for the avoidance of collisions which is the exact opposite of what is designed to be accomplished in the present invention.

There are many patents that have been developed on systems for avoidance of collisions but there are no patents related to the formation of controlled collisions. Kato in U.S. Pat. No. 5,272,483 describes an automobile navigation system that corrects inaccuracies in GPS using inertial guidance, geomagnetic sensor, or vehicle crank shaft speed sensor. Shaw et al in U.S. Pat. Nos. 5,314,037 and 5,529,138 using a laser radar and laser gyroscope for a collision avoidance system. Radars are well known for use in collision avoidance systems such as in U.S. Pat. No. 4,403,220 which involves the use of radars to detect relative headings of aircrafts or ships and a detected object moving relative to the ground. A radar operated collision avoidance system is disclosed in U.S. Pat. No. 4,072,945.

Many collision avoidance systems use microwave radars as ranging and detecting devices and they have two main disadvantages which are the angular width of the main lobe of the radar and the associated angular resolution of the microwave radar. The beam width is inversely proportional to the antenna diameter in wavelength. With the limitation of antenna size, it is very difficult to make a reasonable size microwave radar with beam width less than 3 degrees. At the desired scanning distance, the beam width will scan an area that is much too big and too non-specific to differentiate the received echoes.

There has been a method developed for avoidance of collisions between two robots as discussed in U.S. Pat. No. 6,678,582. In this case, there is automatic configuration of a work cell from a collision avoidance standpoint. It determines automatically which components have collisions with which other components. It involves predicting the configurations of the moving components over a period enough to safely stop and check for interferences, there is no need for a priori knowledge of trajectories.

As discussed in U.S. Pat. No. 7,418,346, there has been a method developed for avoidance of collisions between a host vehicle and other vehicles in which the positions of the vehicles are determined, the vehicles are equipped with transmitter/receiver, and in the host vehicle, the possibility of a collision involving the host, vehicle is assessed by receiving signals from the transmitter/receivers of each other vehicle. Then the received signals are analyzed to extract positional information about the transmitter/receivers from each signal, and when a received signal contains additional information of interest about a possible collision involving the host vehicle, analyzing the extracted positional information to determine whether any signals contain additional information of interest but a possible collision involving, the host vehicle. Other collision avoidance systems include midair collision avoidance system (MCAS) discussed in U.S. Pat. No. 6,278,396 and GPS based collision avoidance system discussed in U.S. Pat. No. 8,068,036. There are no patents that discuss creating controlled collisions between any type a vehicles, much less between trucks.

SUMMARY OF THE INVENTION

The present invention involves a method of having controlled collisions or push between an autonomous vehicle and an obstacle on the roadway or trajectory or with another autonomous vehicle.

The autonomous vehicle detects that there is an obstacle present in the path that does not allow it to proceed any further. The type of route taken by the autonomous vehicle or the decision whether to push the autonomous vehicle is based on the associated costs of different trajectories and the overall time goals.

BRIEF DESCRIPTION OF THE DRAWINGS

The present invention is described in the detailed description that follows, with reference to the following noted drawings that illustrate non-limiting examples of embodiments of the present invention, and in which like reference numerals represent similar parts throughout the drawings.

DETAILED DESCRIPTION OF INVENTION

Elements in the Figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

Unless specifically set forth herein, the terms "a," "an," and "the" are not limited to one element, but instead should be read as meaning "at least one." The terminology includes the words noted above, derivatives thereof, and words of similar import.

The particulars shown herein are given as examples and are for the purposes of illustrative discussion of the embodiments of the present invention only and are presented in the cause of providing what is believed to be the most useful and readily understood description of the principles and conceptual aspects of the present invention.

The system has a series of steps that are described in the next few sections.

Figure 1:
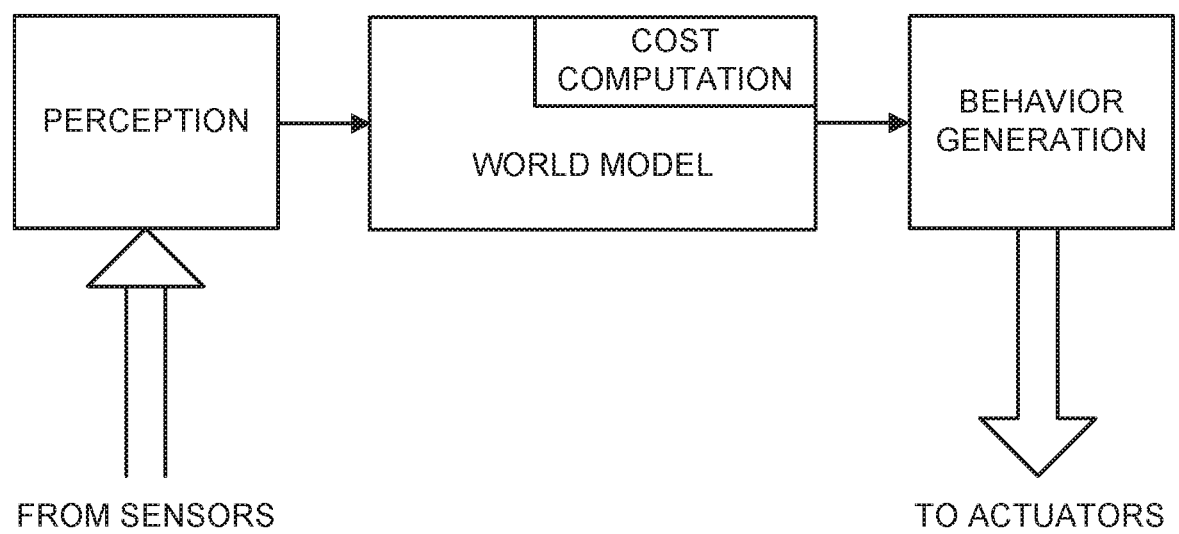
FIG. 1 shows a schematic of the process by which the information goes from the sensors to the actuators via perception, world model, cost computation, and behavior generation.
Figure 2:
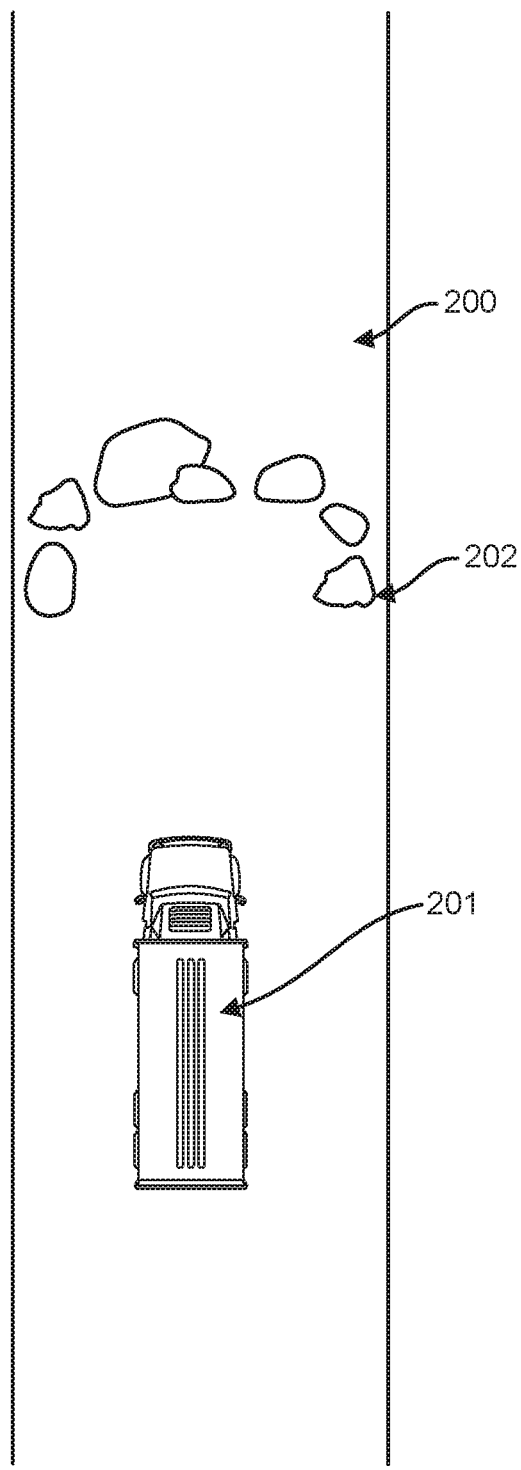
FIG. 2 shows an autonomous vehicle (201) approaching obstacles (202) along its path in the road network (200).
Figure 3:
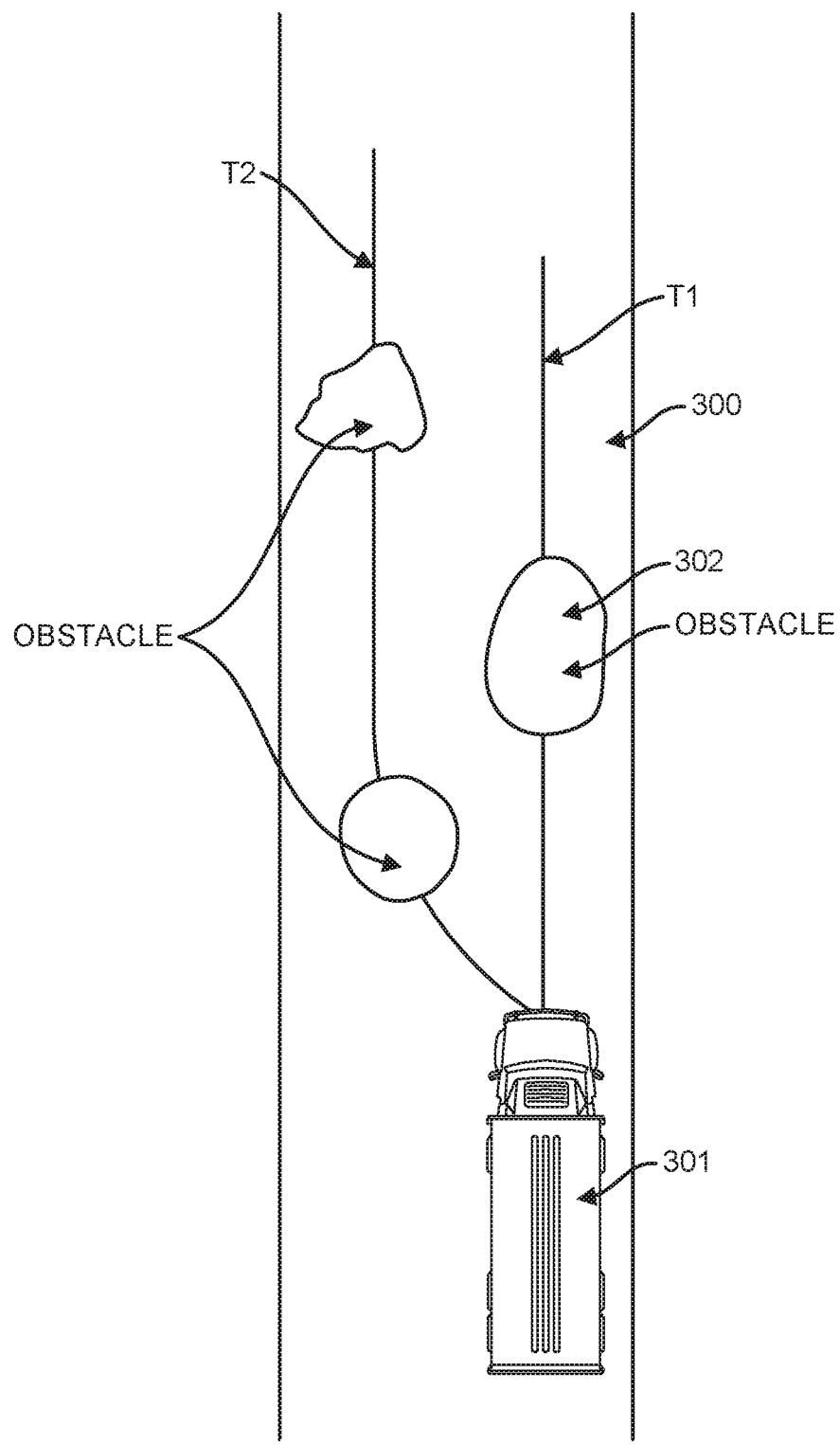
FIG. 3 shows an autonomous vehicle (301) approaching obstacles (302) along its path in the road network (300) and following two different trajectories (T1 and T2).
Figure 4:
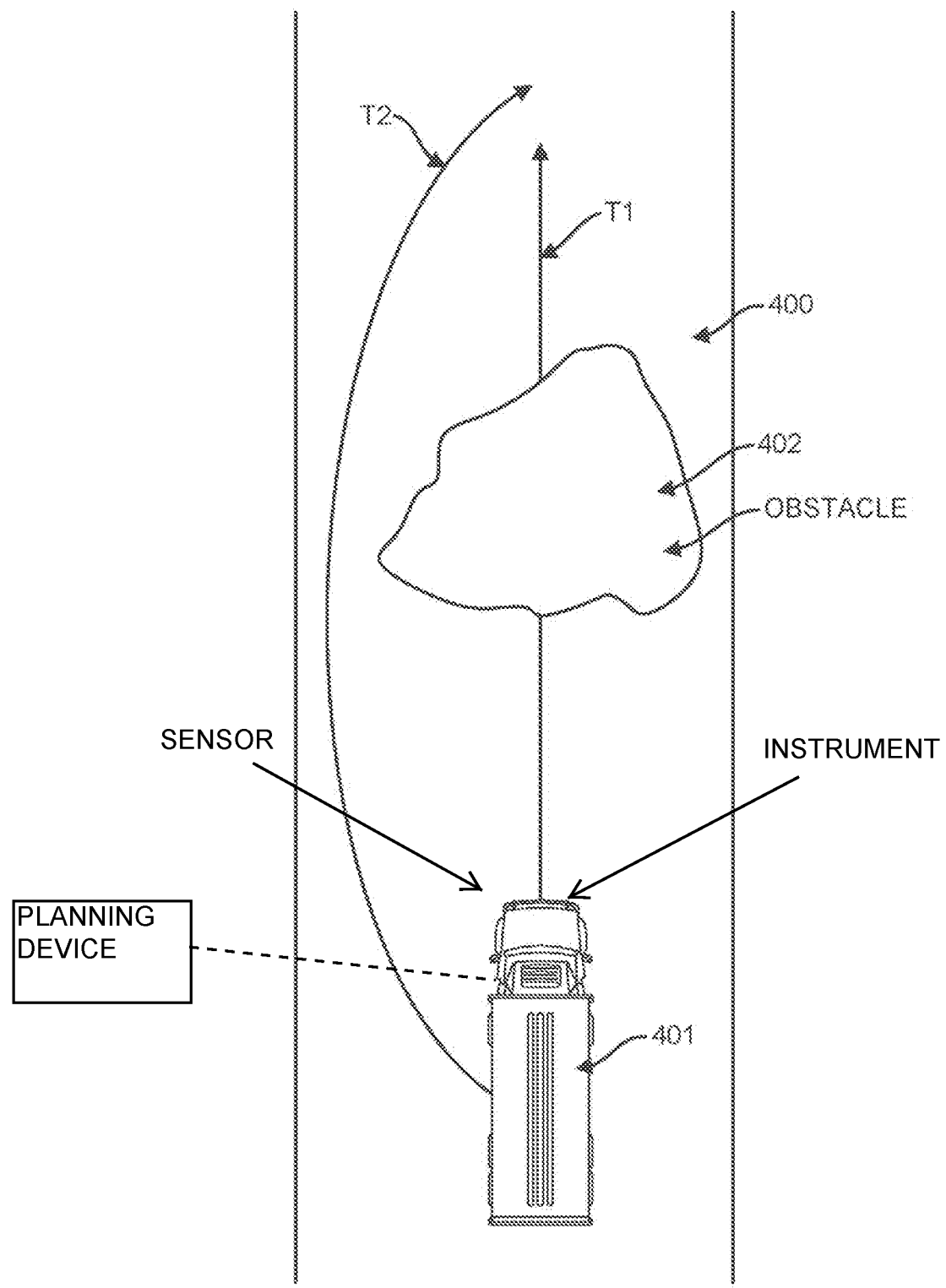
FIG. 4 shows an autonomous vehicle (401) approaching an obstacle (402) along its path in the road network (400). There are two different trajectories presented. The first trajectory (T1) is one in which the obstacle is pushed to continue along its path. The second trajectory (T2) is one in which the autonomous vehicle moves around the obstacle to continue along the path.

Detection of Obstruction: The autonomous system detects that there is an obstacle that does not allow it to proceed as can be seen in the schematic shown in FIG. 1 as well as graphically illustrated in FIG. 2. In FIG. 2, the autonomous vehicle (201) approaches the obstacles (202) that are present along its path in the road network (200). There is a cost Cru associated with traversing an unobstructed trajectory T from the current position to a point P. If there is an obstacle on the traversal to P, the obstructed cost $C_{To}$ along T will be higher. There may be another trajectory T' for where $C_T$ is not significantly higher than $C_{To}$ in which case the vehicle may choose to follow T' rather than T. What is significantly higher, depends on the application and the use. For example, under some circumstances, going around the block rather than pushing an obstacle may be acceptable as can be seen in Trajectory 2 shown in FIG. 4. FIG. 4 shows an autonomous vehicle (401) approaching an obstacle (402) along its path in the road network (400) in which there are two different trajectories that are present. The first trajectory involves the one in which the obstacle is pushed to continue along its path and the second trajectory is the one in which the autonomous vehicle moves around the obstacle to continue along the path. Under other circumstances, the differences in cost can be sufficiently large where risking damage to the vehicle is preferable to travelling long distances to avoid the obstacle as can be seen in Trajectory 1 and Trajectory 2 in FIG. 3. In FIG. 3, the autonomous vehicle (301) approaches obstacles (302) that are present along its path in the road network (300) and follows two different trajectories (T1 and T2). The differences between the cost of the preferred path and cost of the path with the obstruction and the alternative paths that may be unobstructed (although not preferred) can be used to determine if the path is obstructed. A simple threshold can be used depending on the utility function used by the autonomous vehicle. For example, a convoy may decide to push a car on its way if and only if pushing it will lower the overall time to the goal by 20 minutes.

Determination of Obstacle to Control Crash or Push: In the previous section, we presented how differences in cost between the preferred path and the obstructed path and its alternatives can be used to determine if the trajectory is obstructed. Even if we can perfectly compute the cost of moving an obstacle, there is still the question of which obstacle needs to be moved. For example, a trajectory $T_1$ may push through one obstacle while $T_2$ will force the vehicle to go through two obstacles as can be seen in FIG. 3. There is a cost associated with removing the obstacle of $T_1$ which is likely to be different from the cost of removing the obstacles from $T_2$. That being said, the cost of traversing the $T_1$ can be decomposed as the cost of traversing the $T_1$ once the obstacle has been removed plus the cost of removing the obstacle in $T_1$. In a similar manner the cost of traversing $T_2$ can be expressed as the cost of traversing the unobstructed $T_2$ plus the cost of removing both obstacles. That being said, if $C_{T1\_unobstructed} + C_{removing\_obstacle1} + C_{T2\_unobstructed} + C_{removing\_obstacle1} + C_{removing\_obstacle2}$ removing the two obstacles in $T_2$ is preferable to removing the single obstacle from $T_1$. The presented framework uses the additive cost of traversing the unobstructed trajectories in conjunction with the cost of removing the obstacles as a mechanism for selecting which obstacles need to be removed.

The system predicts the position of a moving obstacle to determine the place where collision will take place as well as the predicted damage. A planner is a system that considers different set of actions to select the preferred solution. The above framework allows a traditional planner (A*, dyjkstra, genetic algorithms, etc.) to incorporate the cost of moving obstacle to select the obstacles that need to be pushed or crashed into. The planner performs the optimization across many vehicles in the convoy. In addition, the plan executor tests the forces necessary to move the obstacles by using tractive effort, instrumented bumpers or strain gauges installed in contact areas. The planner considers different collision speeds to minimize individual or overall damage. Also, the planner uses different cost for pushing with the front of the autonomous vehicle and the back of the autonomous vehicle.

Computing the Cost of Pushing: In the previous section, we presented a case for using the additive cost of moving an obstacle as part of the overall cost function to let the planner optimize which obstacles are convenient to move in order to minimize the cost function. This method is only possible if it is possible for the autonomous system to estimate the cost of pushing or crashing into an obstacle. In order to accomplish this estimate, the autonomous system needs to classify the obstructions. The sensors usually used for autonomous mobility are used to compute a variety of physical characteristics that are used to determine the cost. The cost that is computed includes not only the cost of the damage to the autonomous vehicle but also the cost of the damage to the obstacle or obstacles.

These may include all or some of the following: using LADAR, Stereo or other ranging sensor to estimate the volume of the obstacle, using LADAR or cameras to determine the surface and classify the density of the obstacle, using traditional AI techniques (in conjunction with the camera) to determine a class of the obstacle (car, rubble, tank, garbage bag, etc.), and using traditional AI classification technique to determine if the obstacle is buried/attached to the ground versus deposited on the surface.

Once these characteristics are determined the vehicle can approximate the cost of performing the pushing maneuver. This may include the forces applied to the obstacle necessary to perform the maneuver.

Testing the "Pushability": Once the vehicle has determined the cost of pushing and the planner has determined the trajectory to be taken and as a byproduct determined which obstacles need to be pushed. The control system can test that the speed and forces to be applied to the obstacle to see if the costs match the process. The control system can cap the maneuver in order to minimize the chances of damaging the autonomous vehicle. These verification tests can be used to further refine the process of computing the cost of pushing.

Obstacle Free Path for the Vehicles in the Convoy: Although there may be a trajectory (including the pushing maneuver) that significantly reduces the cost of a vehicle in the convoy, it may significantly increase the cost to the other vehicles in the road or in the convoy. For example, it may be easier for one of the vehicles to push an obstacle to other part of the road rather than pushing it off-road. However, the new location creates problems for other vehicles. In previous sections, we presented a planner that is capable of concatenating the cost of unobstructed trajectories with the cost of removing obstacles for a single vehicle. A more complete planner will perform an optimization that includes both the state space of the current vehicle and others. This is a significantly higher search space, and non-optimal optimization is more applicable (RTT, genetic algorithms, etc.).

Figure 5:
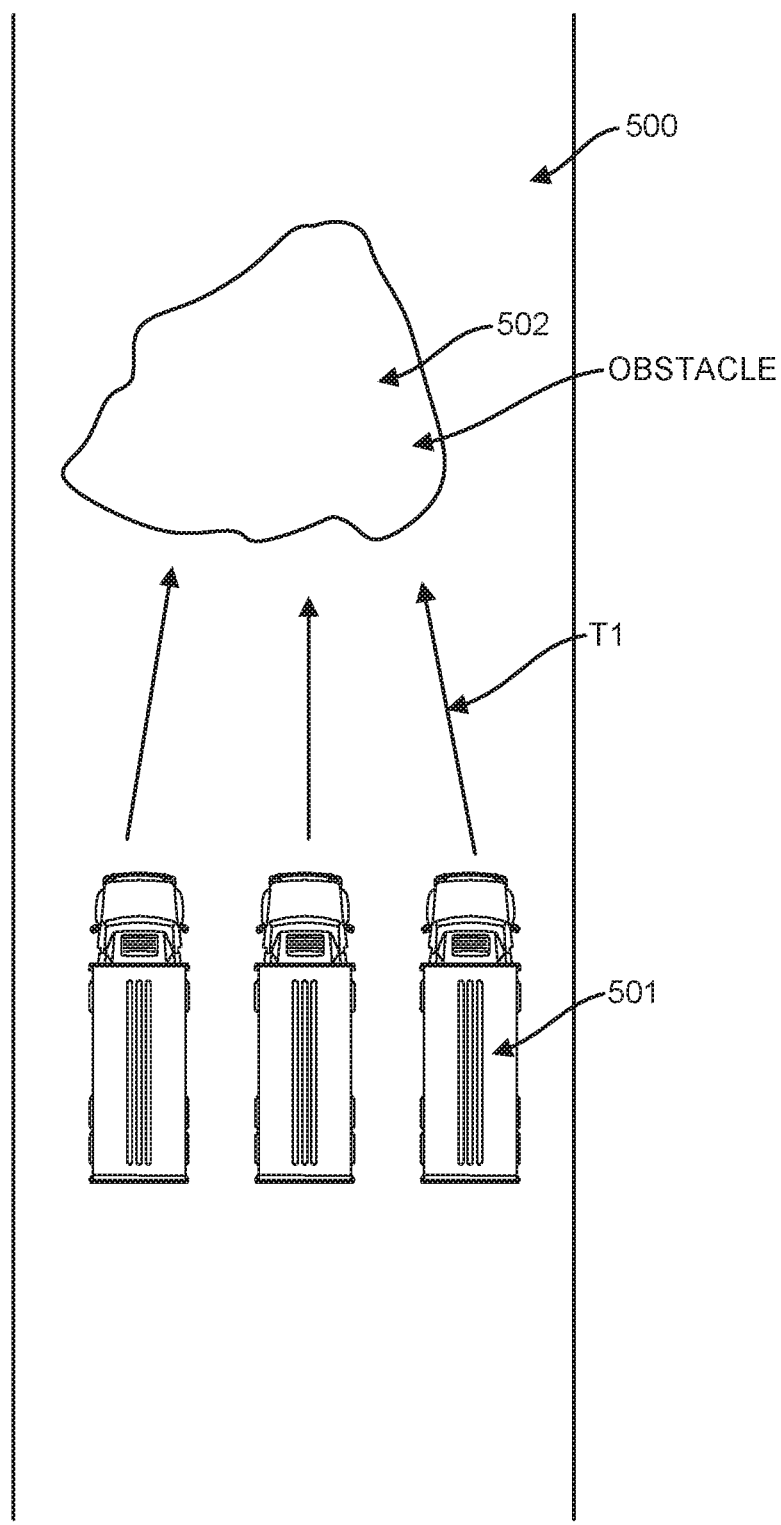
FIG. 5 shows three autonomous vehicles (501) that are simultaneously approaching and pushing an obstacle (502) with the same trajectory in the road network (500).

The trajectories that are taken by the autonomous vehicles account for the fact that there are multiple obstacles that are pushed at the same time. For example, in FIG. 3, in the second trajectory, there are two objects that are pushed at the same time. In another scenario, two or more autonomous vehicles are used to simultaneously push an obstacle present in the road network. FIG. 5 illustrates an example in which three autonomous vehicles (501) simultaneously push an obstacle (502) present in their path in the road network (500).

If the obstacle being pushed is another vehicle, then the directionality of the obstacle is used to determine the least costly trajectory to push and this is the path that will be chosen.

The embodiments of the invention in which an exclusive property or privilege is claimed are defined as follows:

1. An autonomous vehicle navigation system, comprising:
   a plurality of autonomous vehicles, each autonomous vehicle comprising a sensor operable to detect obstacles; and
   a planning device in communication with at least one of the plurality of autonomous vehicles, the planning device being operable to execute stored code to:
   identify a plurality of possible routes for the plurality of autonomous vehicles to traverse to arrive at a destination;
   identify, based on information received from at least one of the sensors, at least one obstacle blocking a first one of the possible routes of the plurality of possible routes;
   compute, for each of the routes of the plurality of possible routes and based at least in part on identifying the at least one obstacle blocking the first one of the possible routes of the plurality of possible routes and based at least in part on estimated traversal times, a traversal cost for each of the routes of the plurality of possible routes;
   select, based on the computed traversal costs, the first one of the possible routes of the plurality of possible routes; and
   causing, in response to the selecting, the plurality of autonomous vehicles to traverse the selected first one of the possible routes of the plurality of possible routes,
   wherein the traversal of the selected first one of the possible routes of the plurality of possible routes comprises causing at least one autonomous vehicle of the plurality of autonomous vehicles to contact the at least one obstacle blocking the first one of the possible routes of the plurality of possible routes,
   wherein at least one autonomous vehicles of the plurality of autonomous vehicles comprises an instrument operable to detect the forces necessary to move the at least one obstacle.

2. The system of claim 1, wherein at least one of the sensors comprises at least one of (i) a LADAR sensor, (ii) a ranging sensor, and (iii) an acoustic sensor.

3. The system of claim 1, wherein the planning device is further operable to execute the stored code to:
   calculate, based on the information received from at least one of the sensors, an estimate of the volume of the at least one obstacle.

4. The system of claim 1, wherein the planning device is further operable to execute the stored code to:
   determine, based on information received from at least one of the sensors that is descriptive of the surface of the at least one obstacle, a classification of the density of the at least one obstacle.

5. The system of claim 1, wherein the computing of the traversal cost for at least one of the routes of the plurality of possible routes is based on information received from the instrument.

6. The system of claim 1, wherein the computed traversal costs are at least partially based on at least one of (i) an estimated cost of damage to the autonomous vehicle, and (ii) an estimated cost of damage to the at least one obstacle.

7. The system of claim 1, wherein the causing comprises causing two or more autonomous vehicles to simultaneously push the at least one obstacle.

8. The system of claim 1, wherein the contact between the at least one autonomous vehicle of the plurality of autonomous vehicles and the at least one obstacle blocking the first one of the possible routes of the plurality of possible routes comprises a movement of the at least one obstacle by the at least one autonomous vehicle exerting the forces necessary to move the at least one obstacle.

9. The system of claim 1, wherein the contact between the at least one autonomous vehicle of the plurality of autonomous vehicles and the at least one obstacle blocking the first one of the possible routes of the plurality of possible routes comprises a pushing of the at least one obstacle by the at least one autonomous vehicle.

10. A method of autonomous vehicle routing, comprising:
    identifying, by a planning device, a plurality of possible routes for at least one autonomous vehicle to traverse to arrive at a destination;
    identifying, by a sensor of the at least one autonomous vehicle, at least one stationary obstacle blocking a first one of the possible routes of the plurality of possible routes;
    computing, for each of the routes of the plurality of possible routes and based at least in part on the identifying of the at least one stationary obstacle blocking the first one of the possible routes of the plurality of possible routes and based at least in part on estimated traversal times, a traversal cost for each of the routes of the plurality of possible routes;
    selecting, based on the computed traversal costs, the first one of the possible routes of the plurality of possible routes;
    traversing, by the at least one autonomous vehicle and in response to the selecting, the selected first one of the possible routes of the plurality of possible routes,
    measuring, utilizing instrumentation coupled to the at least one autonomous vehicle, a force required to move the at least one stationary obstacle blocking the first one of the possible routes of the plurality of possible routes; and
    recomputing, for each of the routes of the plurality of possible routes and based at least in part on the measuring of the force required to move the at least one stationary obstacle blocking the first one of the possible routes of the plurality of possible routes and based at least in part on estimated traversal times, the traversal cost for each of the routes of the plurality of possible routes.

11. The method of claim 10, further comprising:
reselecting, based on the recomputed traversal costs, a second one of the possible routes of the plurality of possible routes; and
traversing, by the at least one autonomous vehicle and in response to the reselecting, the selected second one of the possible routes of the plurality of possible routes.

* * * * *